June 12, 1951 — W. P. KOECHEL — 2,556,374
ACCUMULATING MEANS FOR SEQUENTIAL SAMPLING
Filed May 18, 1946 — 7 Sheets-Sheet 1

INVENTOR
Walter P. Koechel
BY Bartlett, Eyre, Keel & Weymouth
ATTORNEYS

June 12, 1951 W. P. KOECHEL 2,556,374
ACCUMULATING MEANS FOR SEQUENTIAL SAMPLING
Filed May 18, 1946 7 Sheets-Sheet 4

INVENTOR
Walter P. Koechel
BY
Bartlett Eyre Keel & Weymouth
ATTORNEYS

June 12, 1951  W. P. KOECHEL  2,556,374
ACCUMULATING MEANS FOR SEQUENTIAL SAMPLING
Filed May 18, 1946  7 Sheets-Sheet 5

INVENTOR
Walter P. Koechel
BY
Bartlett Eyre Keel & Weymouth
ATTORNEYS

June 12, 1951  W. P. KOECHEL  2,556,374
ACCUMULATING MEANS FOR SEQUENTIAL SAMPLING
Filed May 18, 1946  7 Sheets-Sheet 6

INVENTOR
*Walter P. Koechel*
BY
Bartlett Eyre Keel & Weymouth
ATTORNEYS

June 12, 1951     W. P. KOECHEL     2,556,374
ACCUMULATING MEANS FOR SEQUENTIAL SAMPLING
Filed May 18, 1946     7 Sheets-Sheet 7

INVENTOR
Walter P. Koechel
BY
Bartlett Eyre Keal & Waymouth
ATTORNEYS

Patented June 12, 1951

2,556,374

UNITED STATES PATENT OFFICE 2,556,374

ACCUMULATING MEANS FOR SEQUENTIAL SAMPLING

Walter P. Koechel, Maywood, N. J.

Application May 18, 1946, Serial No. 670,823

17 Claims. (Cl. 177—311)

This invention relates to sequential sampling. Sequential sampling is done by taking account of the sequence of inspection events in which they happen and by coming to a decision of rejection or acceptance in accordance with given sequential mathematical formulae. A conventional method is to provide a chart on which are plotted data for each item inspected, the chart being so arranged that as the items are plotted the plotted points will eventually cross one of two lines. If the plotted points cross the rejection line the lot is then declared rejected. If the plotted points eventually cross the acceptance line the lot is then declared acceptable. One does not know beforehand how many samples will need to be taken but must continue sampling until the plotted points cross either the rejection or acceptance line.

The objections to the above conventional procedure are (a) a separate chart is required for each and every lot inspected; (b) the inspector must have a rather high order of intelligence to use such a chart properly, and (c) it is tedious to stop and plot a point for every item inspected. There are also other disadvantages in this conventional practice.

One object of the present invention is the provision of novel and simple means for sequential sampling operable by the inspector whereby the above indicated objections are avoided.

More specifically, in accordance with my invention, I have devised a means or mechanism of the above indicated character whereby the inspector may be simply operating a lever or levers or equivalent devices during the inspection operation, accurately obtain a definite signal with a minimum number of inspections at the moment when the lot is indicated as acceptable or rejectable, and further whereby the inspector may with equal facility reset the device for inspection of another lot.

A further object of the invention is a means or mechanism of the above entitled character which is further characterized by its simplicity in construction and operation and by the low cost with which it may be manufactured.

The invention is further characterized by its continuous character and once it has been adjusted for the necessary quality factors, the only adjustment required is a single adjustment at the beginning of the inspection of each lot.

The invention is further characterized by the provision of means whereby the adjustments of the quality factors may be quickly and readily effected. For example, the unit may be readily and quickly adjusted with marked facility for any of the four following quality factors: $p_1$—acceptable quality value, A—manufacturer's risk of rejecting lots of better quality than $p_1$, $p_2$—rejectable quality value, and B—customer's risk of accepting lots of quality worse than $p_2$. These four values also go to make up a fifth value known as AOQL.

Other objects of the invention will hereinafter appear.

For a better understanding of the invention, reference may be had to the accompanying drawings forming a part of this application, wherein—

Referring to Figs. 1 to 9 of the drawings, the embodiment of the invention therein illustrated comprises a casing 1 and in the particular embodiment this casing is indicated as rectangular in shape but it may be of any suitable shape. In this particular embodiment the operator or inspector of the items needs only to operate two manually operable levers 2 and 3. The lever 2 is operated for each item inspected where extreme accuracy is required. The lever 2 need not be operated every time when lever 3 is operated if a slight error can be tolerated. The lever 3 is operated for each item which does not come within the predetermined requirements as to quality acceptability.

The invention embodies means responsive to the operation of the lever 2 for each item and to the operation of the lever 3 for each rejectable item which acts as an accumulator of information indicating after a certain number of items have been inspected whether the lot being inspected should be accepted or rejected. In the particular embodiment shown this accumulating means comprises an accumulator disc 4. This accumulator disc 4 rests upon a gear member 5 and by friction between the two members the disc 4 follows the movements of the gear 5. The gear 5 and the accumulator disc 4 are mounted for movement about a stud 6. The disc 4 is operated in clockwise direction (Fig. 3) by means of a drive mechanism interposed between the gear and the operating lever 2. This drive mechanism includes a worm gear 7 journaled on two studs 8 and 9. The worm gear 7 and its shaft 7' are driven by a ratchet wheel 10 which is fastened to the shaft. The ratchet wheel 10 is operated by a pawl 11 which is pivotally mounted by the pivot 11' on one side of the lever 2. This pawl 11 is maintained in engagement with the teeth of the ratchet wheel 10 at all times by means of a spring 12 which is fastened to a pin 13 passing through a slot formed in the lever 2 and mounted on the pawl 11. The other end of the spring 12 is fastened to the shaft 7' carrying the worm 7 and the ratchet wheel 10. The lever 2 in the particular embodiment shown is biased in an upward direction by a spring 15 which is fastened at one end to a stud or post 16 carried by the lever 2 and is anchored at its other end to a post or stud 17. In order to prevent counter motion of the ratchet wheel 10 in the opposite direction from that imparted to it by the pawl 11 there is provided a pawl 18, this pawl being pivotally mounted on a stud 19. The pawl 18 is biased into engagement with the ratchet wheel 10 by means of a spring 20 and this pawl prevents backing up of the ratchet wheel 10 when the pawl 11 and the lever 2 are drawn to the upper position by the spring 15. The gear 5 has imparted thereto small angular movements each time the lever 2 is operated, the angular movement of the gear 5 being determined by the ratio of the drive comprising the ratchet wheel 10, the worm 7 and the diameter of the gear 5. As indicated above, the accumulator disc 4 rests upon the gear 5 and is rotated therewith through the same angular movement imparted to the gear 5 by the lever 2.

Figures 1, 2, 3, 4:
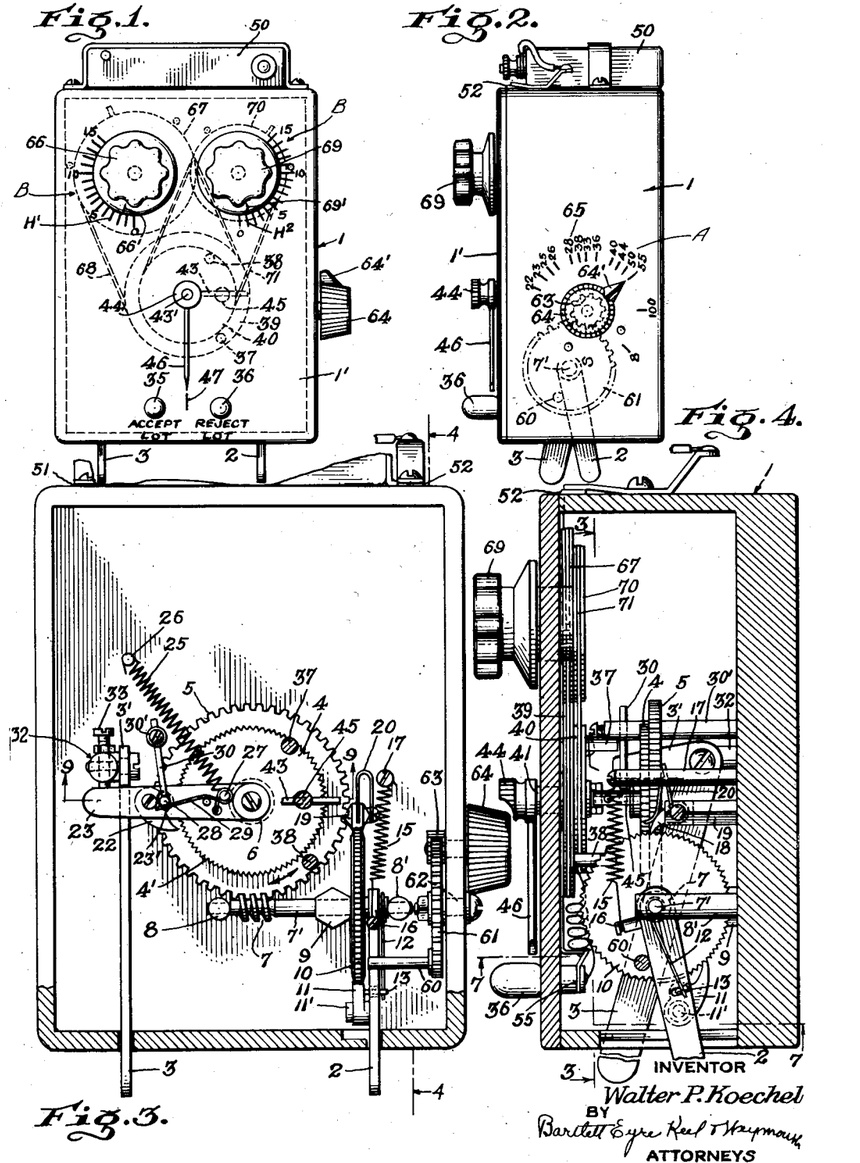
Fig. 1 is a plan view of one embodiment of a means embodying the invention.
Fig. 2 is a side view thereof.
Fig. 3 is a section along the line 3—3 of Fig. 4.
Fig. 4 is a sectional view along the line 4—4 of Fig. 3.
Figures 5, 6, 7, 8, 9:
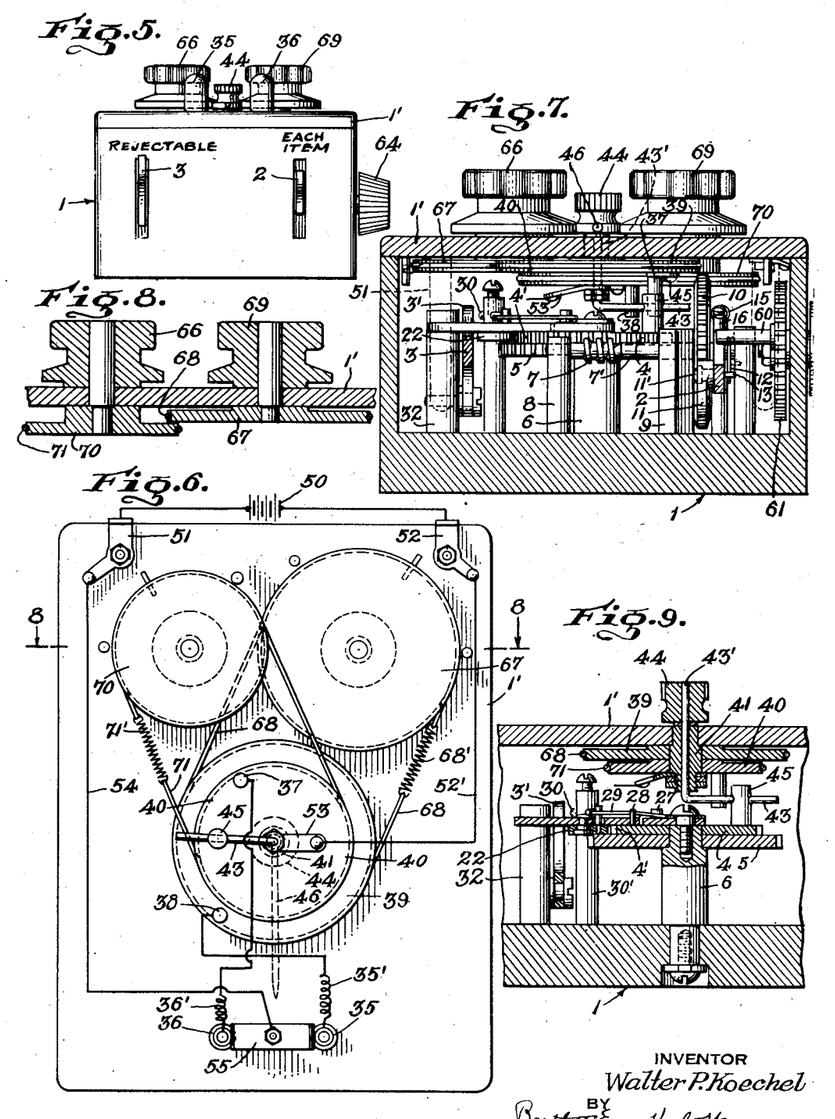
Fig. 5 is an end view thereof.
Fig. 6 is a view of the underside of the lid.
Fig. 7 is a sectional view along the line 7—7 of Fig. 4.
Fig. 8 is a sectional view along the line 8—8 of Fig. 6.
Fig. 9 is a sectional view along the line 9—9 of Fig. 3.
Figure 10:
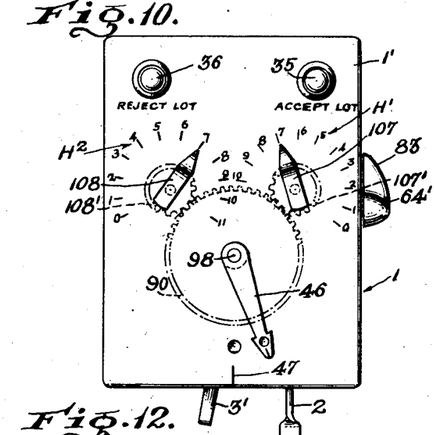
Fig. 10 is a plan view of another embodiment of the invention.

The operation of the lever 3 rotates the accumulator disc 4 in the counterclockwise direction (Fig. 3) counter to the rotation effected by the lever 2. This drive between the lever 3 and the accumulator disc 4 comprises a pawl 22 carried by an arm 23 and engaging the serrated edge 4' of the accumulator disc. The arm 23 is directly operated by the lever 3, the latter being provided with an upstanding portion 3' which projects upwardly above and behind the arm 23 so that when the lever 3 is pushed downwardly the arm 23 is given a counterclockwise movement (Fig. 3) to operate the disc 4 independently of the gear 5 upon which the accumulator disc 4 rests. The arm 23 is biased rearwardly by means of a spring 25 fastened at one end to a stud 26 fastened to the frame or casing and at its other end to a stud 27 carried by the arm 23. The biasing of the arm 23 by the spring 25 operates through the upward extension 3' of the lever 3 to hold the lever 3 in the upper position. The pawl 22 is arranged to engage the serrated edge 4' of the accumulator disc 4 only while the lever 3 is being pushed downwardly. This is effected by a means comprising an escutcheon pin 28 carried by the pawl 22 and projecting through a slot in the arm 23 to a point above the arm 23. This projecting escutcheon pin 28 is biased by a spring 29 whose free end engages the projecting portion of the pin and tends to cause the pawl 22 to engage the serrated edge of the accumulator disc 4. Normally, however, with the lever 3 in its uppermost position the pawl 22 is disengaged from contact with the serrated edge 4' of the accumulator disc 4 by means of a finger 30 engaging the pin 28 on the opposite side from that of the spring 29, the slot 23' in the arm 23 permitting relative movement of the pin 28 and the arm 23. The finger 30 is mounted in any suitable manner as for example on a stud 30'. Thus the moment the lever 3 is moved slightly from its uppermost position the pin 28 is free to move under the influence of the spring 29 to bring the pawl 22 into engagement with the accumulator disc 4 to drive it. The downward stroke of the lever 3 imparts an angular movement to the accumulator disc 4 which is substantially larger than the angular movement imparted to the disc 4 by the downward stroke of the lever 2. The lever 3 is pivotally mounted at its inner end on a stud 32 and this stud is provided with an adjustable screw stop 33 for engaging the arm 23 and thereby limiting its clockwise movement to a predetermined amount (Fig. 3).

The accumulator disc 4 while the inspection of the items continues finally assumes either a position where the lot of items being inspected is acceptable or a position indicating that the lot is not acceptable. These positions of the accumulator disc 4 may be indicated to the inspector in any suitable manner. In the particular embodiment shown means are provided for giving a visual indication to the inspector when the disc reaches one such position and another visual indication to the inspector when the disc reaches the other position. The visual indicating means comprises incandescent electric lamp bulbs 35 and 36, the bulb 35 when lighted indicating that the lot is acceptable and the bulb 36 when lighted indicating that the lot should be rejected. These lamp bulbs 35 and 36 are mounted so as to be visible above the casing 1 and in the particular embodiment shown the bulb bases project through the cover 1' and the center contacts of these bulbs are connected by means of wires 35' and 36' leading respectively to contacts 37 and 38. The contact 38 in the particular embodiment shown is in the form of a stud or post mounted on an adjustable disc 39, this disc being mounted on a hollow stud 41 mounted on the underside of the cover 1'. The contact 37 is similarly in the form of a stud or post mounted on an adjustable disc 40 which is also mounted on the same hollow stud 41 for adjustment thereabout. The contact posts or studs 37 and 38 project downwardly from the lid 1' toward the accumulator disc 4 and the gear 5.

The accumulator disc 4 actuates a switch control member or arm 43 which plays between the contact studs 37 and 38 and when this contact control arm or member 43 engages either the contact 37 or 38 the corresponding visual signal is given. In the particular embodiment shown this contact arm 43 is actuated by a means as follows.

The arm 43 is provided with a right-angular part 43' which is journaled in the hollow stud 41 and this part 43' has fastened to it an adjusting thumb nut 44 disposed above the cover 1' for setting the arm 43. In the particular embodiment shown the drive between the disc 4 and the arm 43 is a friction drive, there being mounted on the arm 43 a cylindrical weight 45 whose lower end rests upon the accumulator disc 4 at a point adjacent its outer edge. The arm part 43' has free up and down movements permitting the weight 45 to rest upon the disc 4 with the full weight of the arm 43, 43' and the weight 45. Thus when the disc 4 moves it carries with it the weight 45 and the contact control arm 43. At the same time this friction drive permits the setting of the arm 43 from the outside of the casing by engaging the thumb nut 44. A pointer 46 is mounted on the thumb nut 44 and on the upper side of the lid 1' is disposed a gauge or scale mark 47 which is the starting mark to which the pointer is adjusted before the use of the machine in connection with the inspection of each new lot of items. The calibrating mark 47 establishes a starting point which is used to orient the position of contact studs 37 and 38, and at the beginning of the inspection of each lot of items the pointer 46 is adjusted to a position in line with the calibrating mark 47.

The electrical circuit including the contact posts 37 and 38 and the lamp bulbs 35 and 36 includes a battery source 50 which is connected with the terminals 51 and 52. A wire 52' leads from the terminal 52 to the hollow stud 41 through a terminal 53 and thus the contact arm 43, 43' is energized by the conductor 52' and the terminal 53 through the hollow stud 41. This forms one terminal for the lamps 35 and 36 depending upon whether the arm 43 is in contact with 37 or 38. The other battery terminal 51 is connected by a wire 54 with a common contact spring 55, the ends of the contact spring 55 being connected with the shells of both lamps.

In the particular embodiment shown in Figs. 1 to 9 and as there shown adjusted, the inspection is on a basis of roughly 5% manufacturer's risk and 5% customer's risk but this embodiment of the invention is provided with adjustments to vary either the manufacturer's risk or the customer's risk or both.

Figure 23:
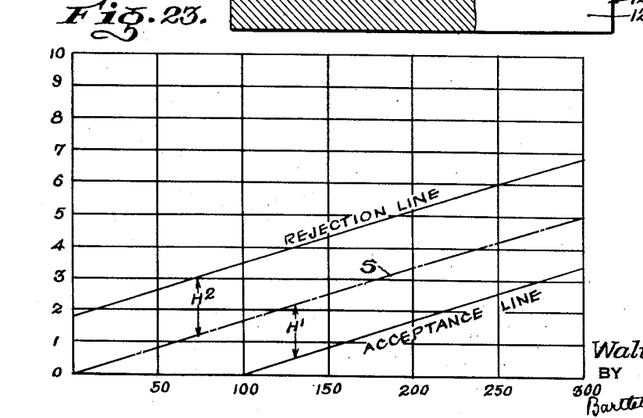
Fig. 23 is an illustrative diagram.

The adjustment of the embodiment above described is based on a relationship shown in Fig. 23. In this chart the dot and dash line represents the slope. It is the reciprocal of this slope which is translated into a ratio of angular movement of accumulator disc 4 as effected by levers 2 and 3. Thus the slope shown in Fig. 23 is roughly .018. The reciprocal of this is roughly 55 and this means that lever 2 would cause an angular movement of disc 4 $\frac{1}{55}$ of that caused by lever 3. On Fig. 23 there are also two solid lines parallel to the dot and dash line. The upper line, called the "rejection" line is displaced from the dot and dash line by a value known as $H_2$. The lower solid line, called the "acceptance" line is displaced by a value known as $H_1$. This embodiment, as indicated above, is provided with an adjusting means indicated generally at A for adjusting the ratio of the movements of the accumulator disc 4 effected by the levers 2 and 3 and this provides a means for changing the slope S corresponding to the ratio of movements of the levers 2 and 3. This embodiment is also provided with means for varying the displacements of the acceptance line and the rejection line from the slope S indicated by the $H_1$ and $H_2$ on the chart and this means is indicated at B. This diagram, Fig. 23, is based on the conventional formula for the quality factors in the sequential sampling referred to above as follows:

$$S = \frac{\text{Log} \frac{1-P_1}{1-P_2}}{\text{Log} \frac{P_2}{P_1} \frac{1-P_1}{1-P_2}}$$

$$H_2 = \frac{\text{Log} \frac{A}{1-B}}{\text{Log} \frac{P_2}{P_1} \frac{1-P_1}{1-P_2}}$$

$$H_1 = \frac{\text{Log} \frac{B}{1-B}}{\text{Log} \frac{P_2}{P_1} \frac{1-P_1}{1-P_2}}$$

wherein $P_1$ = acceptable quality level
$P_2$ = unacceptable quality level
A = risk of rejecting lot of quality better than $P_1$
B = risk of accepting lot worse than $P_2$ The adjusting means A for the ratio of movements comprises a variable stop 60 which is mounted on a gear 61 journaled on a stud 62 mounted in the side of the casing 1 and this stop 60 projects over the lever 2 to limit the stroke of the lever 2. Thus by adjusting the gear 61 the stop 60 may be moved up or down as may be desired to obtain the desired slope. The gear 61 meshes with a small pinion 63 which is mounted to rotate with an exterior adjusting knob 64 and this knob is provided with a pointer 64' which traverses a slope scale 65. As indicated above this is adjusted in the particular embodiment shown for a slope of .018 or roughly that, the reciprocal of that being 55 as appears on the slope scale.

For convenience, the scales of the adjusting means B are indicated at $H_1$ and $H_2$ corresponding to the lettering of the chart of Fig. 23, these scales being fixed on the upper side of the lid 1' of the casing. For the scale $H_1$ an adjustable knob 66 with a suitable pointer, or as shown in the drawing, an indicating mark 66', indicates the position of the knob relatively to the scale $H_1$. The knob 66 is mounted on a stud projecting downwardly through the lid 1' and to this stud is fixed a pulley 67 which drives the disc 39 carrying the contact post 38 through a belt or cord 68 and a tension spring 68' is incorporated in it as a part of the belt. An adjusting knob 69 is also mounted on the casing lid and this also carries an indicating mark 69' which cooperates with the scale H₂. The knob 69 is mounted on a stud which projects downwardly through the lid and upon this stud is mounted a pulley 70 which rotates with the knob and drives the disc 49 through a belt or cord 71. Thus by adjusting the knobs 66 and 69 the contact control posts 37 and 38 are adjusted relatively to each other and to the contact controlling arm 43.

Figure 11:
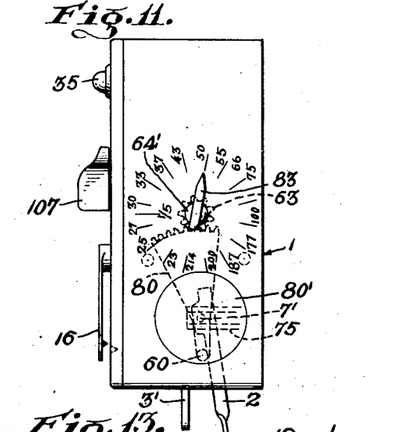
Fig. 11 is a side view thereof.

In the embodiment of Figs. 10 to 17, the casing is indicated at the numeral 1 and a cover or lid 1' is provided for the casing. Similarly to the above modification a worm shaft 7' having a worm 7 is journaled in studs or posts 75 mounted on the bottom of the casing and the worm 7 drives a worm gear 5 which is revolvably mounted on a stud 6 carried by the bottom of the casing. An accumulator disc 4 is journaled for rotation about a shaft 6' projecting up from the stud 6 and this accumulator disc 4 rests by gravity upon the gear 5 and is frictionally driven thereby. The shaft 7' carries a ratchet wheel 10 which is keyed to the shaft and a pawl 11 is pivotally fastened to the side of the lever 2 and the toe of the pawl is maintained in contact with the serrated edge of the ratchet wheel 10 by means of a spring 12' fastened at one end to a pin 13 mounted on the pawl and fastened at its other end to a bracket 77 carried by the casing. The lever 2 is journaled on the shaft 7' at a point between the ratchet wheel and a post or stud 75 and a spring 15' fastened at one end to the lever 2 and fastened at its other end, as indicated by screw 76 to the bottom of the casing, maintains the outer end of lever 2 in the upper position. A leaf spring 77 is fastened at one end by the screw 76, with the free end of 77 bearing against the side of the ratchet wheel 10 to create thrust on shaft 7' to prevent lost motion. A pawl 78 is provided on the opposite side of the ratchet wheel 10 from the pawl 11 and is pivotally mounted on a bracket 78' fastened to the bottom of the casing and a spring 79 bears against the pawl 78 maintaining the latter in engagement with the serrated edge of the ratchet wheel to avoid backup of the ratchet. The downward movement of the lever 2 results in the rotation of the ratchet wheel through an angle determined by the length of the downward stroke. This downward stroke is limited by an adjustable stop 60 whose free end is disposed above the lever 2, the latter being mounted in engagement with the adjustable stop by means of the spring 15'. The adjustable stop 60 is carried by one end of a gear segment 80 which is fastened to the journal 80' which is journaled in the side of the casing. The gear segment and the stop 60 are adjusted by a knob 64' which is journaled in the side of the casing and carries on the inner end a gear 63 which meshes with the gear segment 80. The knob 64' is provided with a pointer 83 traversing a suitable scale as indicated in Fig. 11 calibrated to indicate values of 1/S.

Figures 12, 13:
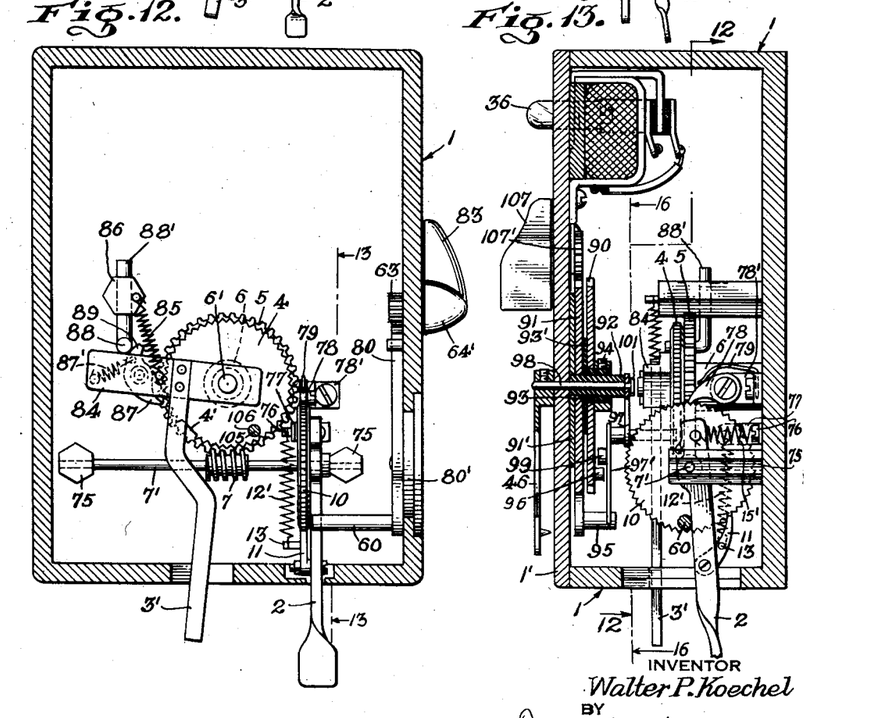
Fig. 12 is a sectional view along line 12—12 of Fig. 13.
Fig. 13 is a sectional view along the line 13—13 of Fig. 12.
Figures 14, 15, 16, 17:
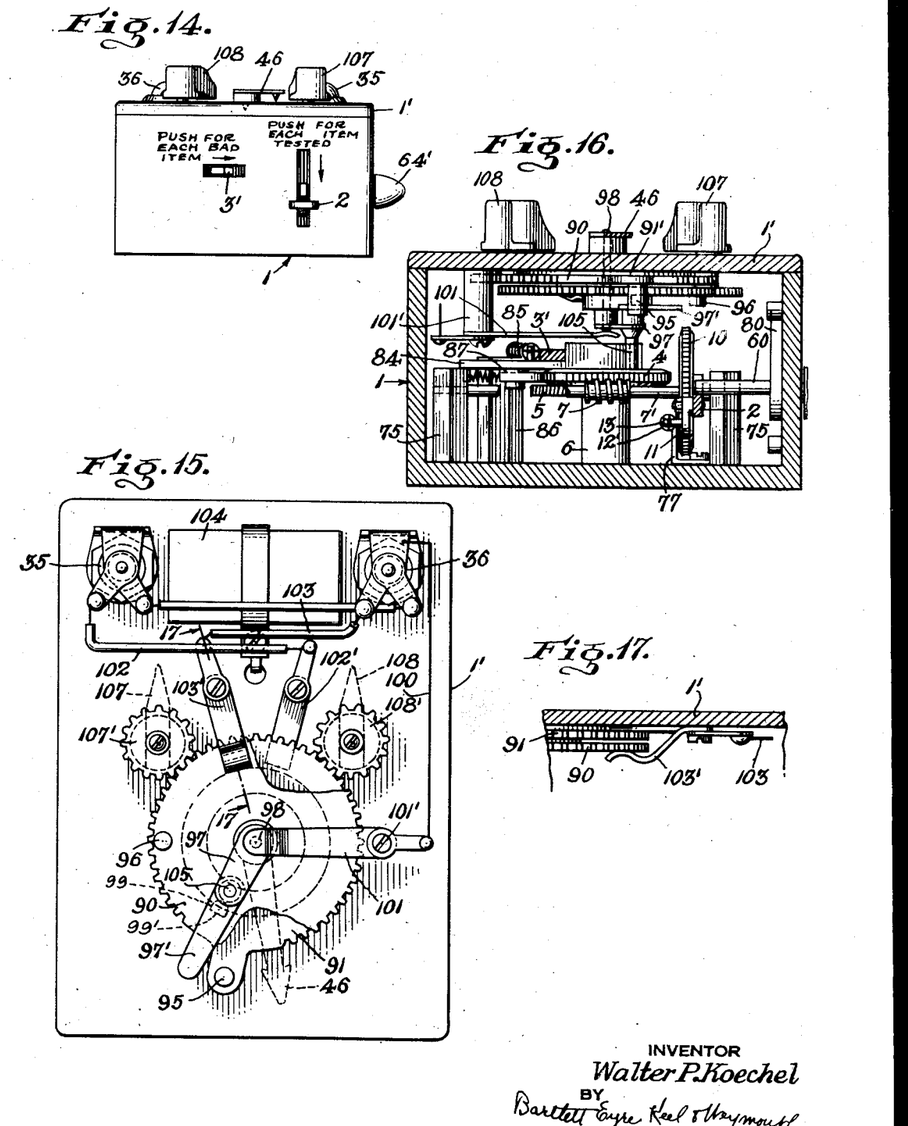
Fig. 14 is an end view of the embodiment.
Fig. 15 is a view of the underside of the cover or lid of this embodiment.
Fig. 16 is a sectional view along the line 16—16 of Fig. 13.
Fig. 17 is a sectional view along the line 17—17 of Fig. 15.

The lever 3' corresponding to the lever 3 of the above described embodiment projects out through a horizontal slot in the end of the casing and is moved by the inspector to operate the accumulator disc 4 independently of the gear 5 upon which it rests and in opposition to the movement imparted by the lever 2. The lever 3' is mounted on an arm 84 freely journaled on the shaft 6' and a spring 85 fastened at one end to the arm and at the other end to a pin projecting up from a vertical stud 86, the latter being mounted on the bottom of the casing. The spring 85 biases the lever 3' in a clockwise direction (Fig. 12).

This arm 84 carries a pawl 87 on its under side and this pawl is urged by a spring 87' in a direction to engage the serrated edge of the accumulator disc 4 so as to engage the accumulator disc and operate the same when the lever 3' is moved counter clockwise to indicate a rejectable item. In order to maintain the pawl 87 out of engagement with the accumulator disc 4 when the lever 3' is not being operated, a fixed finger 88 engages a heel 89 of the pawl to maintain the toe of the pawl out of engagement with the accumulator disc. This finger 88 is provided with a supporting part 88' which is fastened to the stud 86. The serrated edge of the accumulator disc 4 is provided with a gap 4' for a purpose hereinafter described.

Similarly to the above described embodiment the indicators are visual indicators in the form of electric light bulbs 35 and 36. When the accumulator disc 4 reaches either of its limiting positions for the particular adjustment range, one of these indicators is operated. A pair of gear elements 90 and 91 are journaled about an insulating sleeve 92 carried by the underside of the cover or lid 1' and provided with a disc 91' in engagement with the underside of the lid. These gear elements 90 and 91 are insulated from each other by means of an insulating sleeve 93 and disc 93' and a fastening or holding nut 94 disposed about the sleeve 93 holds the gears 90 and 91 in assembled relation. These gear elements 90 and 91 carry the contact elements controlling the circuits of the lamp bulbs 35 and 36. One of these contacts is a pin 95 carried by the gear 91 and the other contact is carried by the gear 90 and is indicated at 96. The circuit controlling member actuated by the accumulator disc 4 comprises a movable arm 97 which is fastened to a shaft 98 journaled in the bushing 92 and the arm 97 is provided with an extension 97' which is offset in a vertical direction from 97. The outer end of 97' at one extreme of its range makes contact with the pin contact 95 carried by gear 91. On its upper side the extension 97' carries a contact making lug 99 for engaging the contact 96 carried by the gear 90 at the other extreme of the movement of the arm 97. In the particular embodiment shown the contact pin 96 is of circular shape and the lug 99 is provided with a flattened side 99' which frictionally engages the periphery of the contact member 96 to close the circuit and at the same time permits the passage of the extension 97' to opposite sides of the contact 96 for a purpose hereinafter set forth. The frictional contact is facilitated by the extension 97' being a leaf spring and yielding slightly downwardly when the lug 99 engages the contact 96. The contact arm 97 is connected with the common wire 100 by means of a leaf spring contact 101 which is fastened to a stud 101' carried on the under side of the cover, the free end of the leaf spring 101 bearing against the inner end of the arm 97. The center contact of the socket for the lamp 35 is connected by means of a conductor 102 leading to a leaf spring contact 102' which frictionally engages the side of the gear elements 91. The center contact of the socket for the lamp 36 is connected by a wire 103 with a leaf spring contact 103' whose free end bears upon the under side of the gear 90. The battery 104 is connected in circuit in any suitable manner (omitted for convenience) to energize the circuit.

In this embodiment the contact arm 97, 97' is not frictionally driven by the accumulator disc but is coupled thereto by means of a coupling pin 105 carried by the arm 97 with its free end resting in a recess 106 formed on the upper surface of the accumulator disc 4 near the periphery thereof and roughly 45° from the gap 4' formed in the serrated edge of the accumulator disc.

The shaft 98 carrying the arm 97 projects up through the lid 1' and is fastened to a pointer 46, the latter having a marker 47 indicating the position to which the pointer 46 may be adjusted from the exterior of the casing for the beginning of the inspection of a lot of items.

The gear discs carrying the contacts 95 and 96 may be adjusted to vary the angular displacement between the contacts 95 and 96 by means of the knobs 107 and 108, these knobs being journaled in the lid and carrying pinions 107' and 108'. These knobs 107 and 108 are provided with pointers traversing respectively the scales $H_2$ and $H_1$ provided on the lid.

The purpose of gap 4' is to prevent accumulator disc 2 from over travelling. This is accomplished by gap 4' reaching the circumferential point where pawl 87 is in operation. When it reaches this point, there are no teeth for pawl 87 to engage and thus this represents the maximum distance which disc 4 can travel.

The purpose of permitting contact lug 99 to pass to the opposite side of contact 96 is to prevent jamming. If this underpass were not provided, then contact 96 and lug 99 would become jammed after a certain amount of strokes by lever 2 and this might cause internal damage to the instrument. This underpass of lug 99 and contact 96 thus acts as a safety device.

In the embodiment of Figs. 18 to 22 provision is made for simultaneous accumulation of various classes of defects in the same product and in this particular embodiment provision is made for three classes of defects. For example, if a product has defects which may be classified as critical, major and minor these may have AOQL values of 1%, 2% and 4% respectively. By the use of this embodiment the inspector may simultaneously accumulate the data of three classes of defects with no more effort than is required to accumulate the data for a single class of defects as provided for in the modifications described above and provision is made for translating the data accumulated for each class of defects into signals either collectively or individually.

Figure 18:
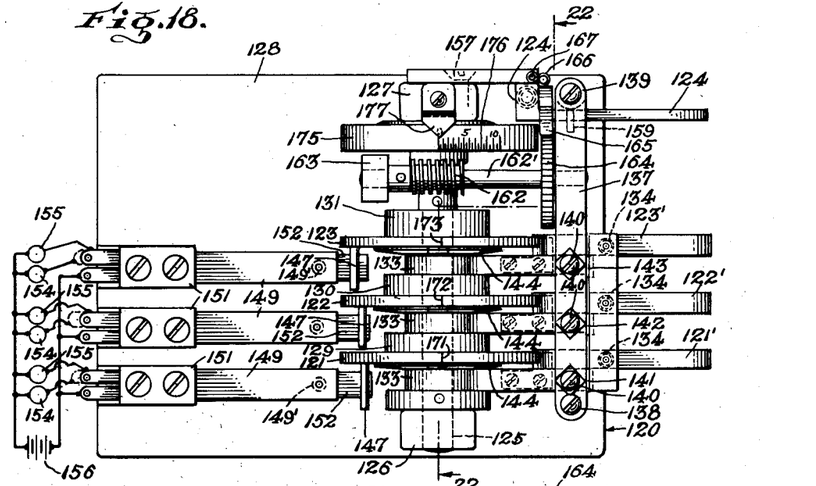
Fig. 18 is a plan view of the mechanism of another embodiment of the invention.
Figure 19:
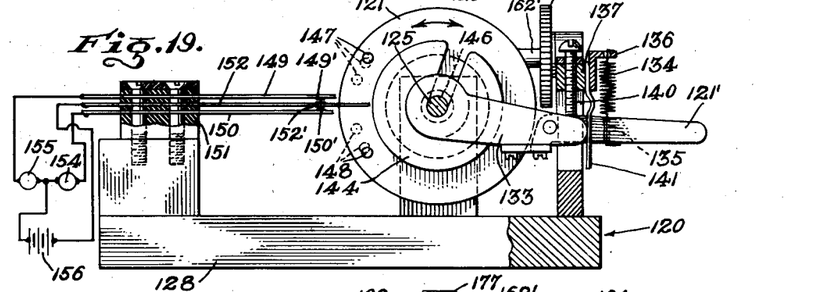
Fig. 19 is a side view thereof.
Figure 20:
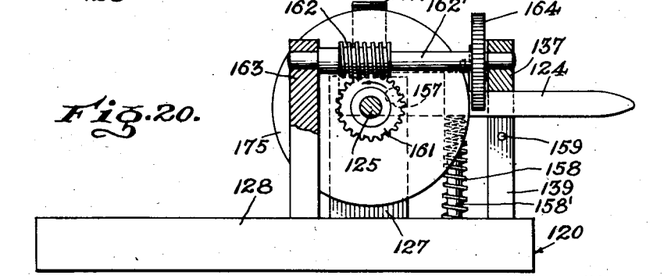
Fig. 20 is a further side view of a part thereof.
Figure 21:
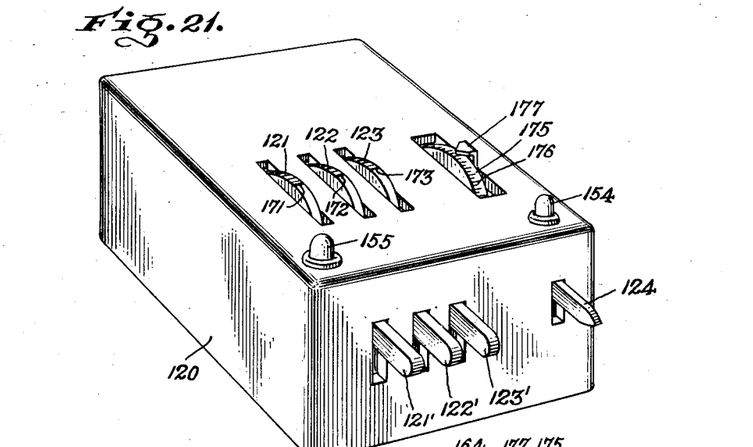
Fig. 21 is a perspective view of this embodiment in a suitable housing or casing.
Figure 22:
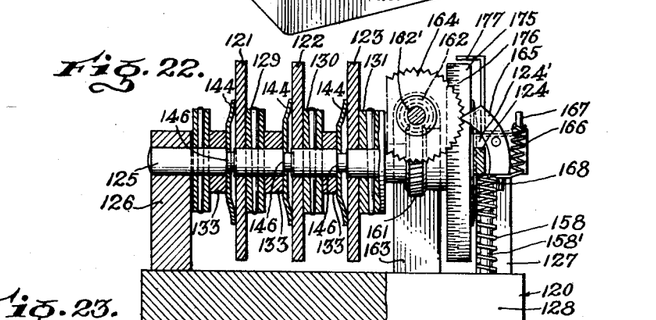
Fig. 22 is a sectional view along the line 22—22 of Fig. 18.

Referring to this embodiment the unit comprises a casing 120 illustrated somewhat diagrammatically and having therewithin the operative unit. This unit comprises a multiple number of discs and in the particular embodiment shown there are three such accumulator discs 121, 122 and 123 projecting out through slots above the casing 120 so as to be readily engageable by the fingers for adjustment. These discs are operated in one direction by levers 121', 122' and 123', these levers projecting out through slots formed in the side of the casing. That is, these accumulator discs are operated individually by these levers to indicate defective data of three different classes of defects as, for example, critical, major and minor. The discs are operated together and simultaneously by the lever 124. That is they are operated in unison and in the opposite direction of rotation from that imparted by the individual operating levers 121', 122' and 123'. The accumulator discs 121, 122 and 123 are journaled on a shaft 125, this shaft being mounted at its ends on standards 126 and 127, the standards being mounted on a base 128 which may form, if desired, the bottom of the casing 120. The shaft 125 is provided with collars or flanges 129, 130 and 131 against which the accumulator discs 121, 122 and 123 frictionally bear respectively. The levers 121', 122' and 123' are pivotally fastened to one side of carrier arms which are journaled on the shaft 125. These are all identical and a description of one will be sufficient. Each carrier arm 133 has at its inner end an opening to accommodate the shaft 125 when assembled thereon with the arm freely oscillatable about the shaft with a minimum of friction. The levers are pivoted to the sides of the outer ends of these arms for limited relative pivotal movement in the plane of the disc and the pivotal axis of each lever is nearer the upper edge of the carrying arm than the lower edge and similarly with respect to the inner end of the lever. Accordingly with the inner end of each lever being somewhat closely disposed to the periphery of its corresponding disc the lower edge of the inner end of the lever engages the periphery of the disc during the first movement of the lever and thereafter the rest of the downward movement of the lever results in the rotation of its disc along with the lever and its carrying arm.

Each lever is provided with a spring 134, the lower end of the spring being fastened to the lever in any suitable manner as, for example, by having a straight end part passing through an opening indicated at 135 and bent over to engage underneath the lever while the upper end of the spring is fastened to an L-shaped bracket member 136 carried by a cross frame member 137 mounted on studs 138 and 139. These springs tend to hold the levers 121', 122', 123' in the uppermost position. The upper limit of the strokes of the levers is limited by screws 140 passing downwardly through the frame member 137 and engaged by the outer ends of the arms 133. In order to assure the movement of the levers 121', 122', 123' independently of the carrying arms to clutch the disc, the movement of the arms is resisted by spring members 141, 142, 143 bearing against the ends of the lever and in the particular embodiment shown these three braking springs are formed from a single piece of spring metal caught between the L-shaped member 136 and the frame member 137. In order to increase the frictional resistance of the discs 121, 122 and 123 to rotation on the shaft 125 spring discs 144 are provided between the carrier arms and the discs to bias the discs against the collars or flanges 129, 130 and 131. Thus by operating either of the levers 121', 122', 123' its corresponding acculator disc is moved through a predetermined angle.

The shaft is provided with a groove 146 all the way around for the reception of the spring discs 144 and each of the latter is provided with a radial slot extending from the periphery past the center thereof for resting in the groove. This permits a spring disc to be slid laterally over the shaft into the groove for anchoring in position. The disc as indicated, is sprung or has a constraint imparted thereto as by dishing it out so that when the disc is inserted in position between an arm 133 and a disc it frictionally engages the disc so as to cause the disc to rotate with the shaft 125 by a friction coupling but still permitting the individual actuation of the accumulator discs by the levers 121', 122' and 123'.

Each of the discs is provided with a spaced pair of signal actuating fingers 147 and 148, these actuators 147 and 148 corresponding respectively to the acceptable and rejectable signals. In the particular embodiment shown these signal actuators 147 and 148 operate to close electric signal circuits, the current signal including a contact arm 149 and the red signal circuit including a contact arm 150, these contact or spring arms 149, 150 being insulatedly mounted in a block 151 which in turn is mounted on the base 128. A spring arm 152 which is also insulatedly mounted in the block 151 projects into the path of the actuators 147 and 148. Normally the contact 152' carried by the spring member 152 is out of contact with either the contact 149' or the contact 150' but when the end of the spring 152 is engaged by the actuator 147 the circuit is closed at 150', 152' to light a green lamp 154. The actuator 148 on the other hand closes the circuit between the strips 152 and 149 to light the red light 155. A source of current as, for example, a battery 156 is illustrated for energizing the signal lamps 154 and 155.

The accumulator discs 121, 122 and 123 are as indicated above operated in unison by a lever member 124, this lever member being pivoted at its inner end at 157 to the side of the bracket 127 and is provided intermediate its ends with an offset part 124'. A compression spring 153 is fastened to the underside of the offset part 124' of the lever 124 and is anchored at its lower end to the base 128 by means of a stud 158' extending up into the spring. This spring biases the lever 124 upwardly against the underside of the frame member 137 with the latter forming the limit of the upper part of the stroke of the lever. The stroke of the lever 124 is limited in the downward direction by a pin 159 projecting laterally from the stud 139. This lever 124 imparts a small angular movement at each stroke to the discs 121, 122 and 123 through a pawl-ratchet-worm gear drive. The shaft 125 carries a worm gear 161 and a worm drive 162 meshes with the gear 161, this worm 162 being carried by a shaft 162' which is journaled at one end in the frame member 137 and at its other end in a bracket 163 projecting upwardly from the base. This shaft 162' carries a ratchet wheel 164 and the lever 124 carries a pawl 165 which engages the ratchet wheel 164 to operate the shaft 162' during the upward stroke of the lever 124. This pawl 165 is pivotally fastened to the offset part 124' of the lever and a spring 166 urges the pawl into operative engagement with the ratchet wheel, the upper end of this spring being fastened as by a pin 167 to the lever and the lower end thereof being attached to a pin 168 to the lower end of the pawl 165 below the pivot thereof. The lever 124 is operated each time an item is inspected and this actuates the discs 121, 122 and 123 through angular movements depending upon the stroke of the lever 124 and the ratio of speed reduction between the lever 124 and the shaft 125. This movement of the discs for each actuation of the lever 124 corresponds in function to the movement of the levers 2 of the above described modifications and the accumulator discs 121, 122 and 123 are actuated in a direction to cause the actuators 147 to operate the signal device 154 which corresponds to an acceptable lot of items.

On the other hand the actuation of the individual levers 121', 122' and 123' actuates their corresponding accumulator discs in directions to cause the signal actuators 148 to actuate the signal device 155 or devices which correspond to rejectable items. As the inspector proceeds with the inspection of a lot of items the lever 124 is operated for each item and one or more of the levers 121', 122' and 123' is actuated depending upon whether that particular item is rejectable as having a critical, major or minor defect. If either a critical, major or minor defect is indicated before a signal indicating that the lot is acceptable is given, the inspector may proceed if desired with the inspection of the lot to determine whether one or both of the other defective signals corresponding to the other classes of defects are given before acceptable signals are given. The display of a rejectable signal for either of the classes of defects may of course be the determining factor as to whether the lot is rejectable as a whole but by continuing the tests and inspection of the lot after one rejectable signal is given, one can determine whether the percentage of items having the other defects is unduly large.

At the beginnning of the inspection of a lot of items the accumulator discs 121, 122 and 123 are adjusted to a predetermined position or positions with the spring contact arm 152 or the outer end thereof being disposed at a predetermined point between the actuators 147 and 148. This relationship from the beginning of the inspection is indicated by indicator marks 171, 172 and 173 respectively on the peripheries of the discs 121, 122 and 123 and the arrangement is preferably such that the accumulator discs are adjusted to a position where these marks are in line with each other. In the particular embodiment shown there is a pair of signals 154 and 155 for each of the accumulator discs but it is understood that if desired a single pair of signals 154 and 155 may be connected in multiple across the controlling contacts 149', 150' and 152' so as to respond to the first of the three accumulator discs to actuate a signal.

In the particular embodiment shown I have indicated a counter disc 175 which is also journaled on the shaft 125 for frictional drive thereby similarly to the mounting of the accumulator disc. This disc 175 has a scale 176 thereon, and a fixed pointer 177 which is carried by the member 127 is juxtaposed to the scale 176 to indicate the number of items inspected. At the beginning of the inspection of each lot the disc 175 is adjusted to bring the pointer 177 to zero on the scale.

Figure 24:
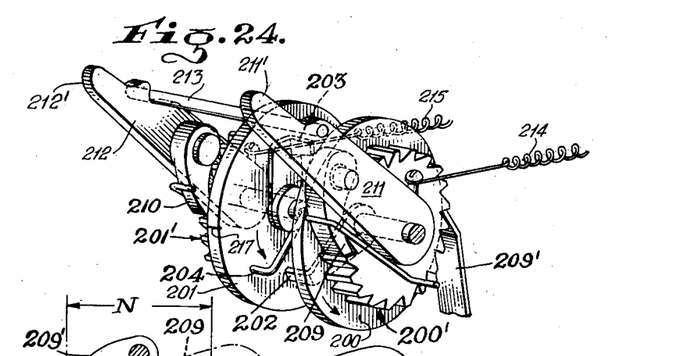
Fig. 24 is a perspective view of another modification of the invention.
Figure 25:
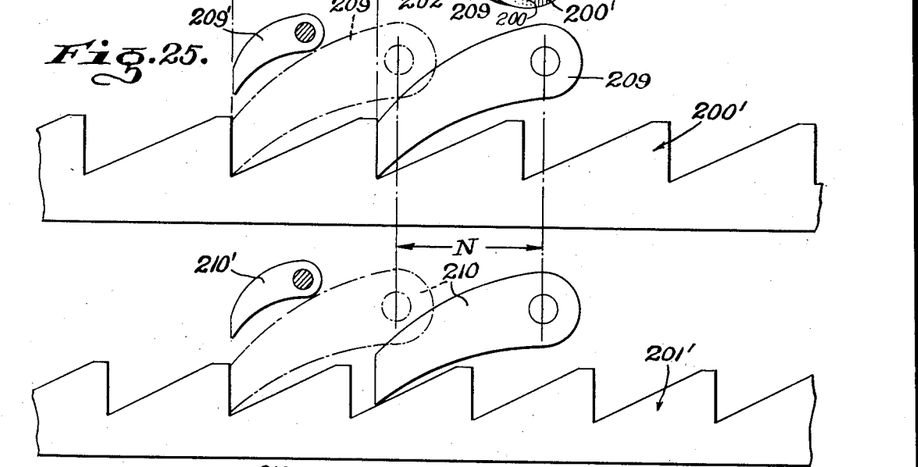
Fig. 25 is an illustrative diagrammatic drawing on a large scale illustrating a feature of this modification.
Figure 26:
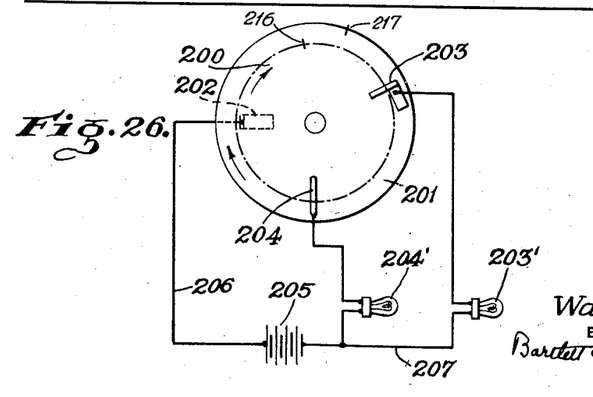
Fig. 26 is a schematic view showing a suitable indicating means for the accumulator of this embodiment.

In the embodiment of Figs. 24 to 26 provision is made for the accumulation and coordination for a single class of defects and in this embodiment this is effected by a multiple number of accumulator coordinated discs, there being two such discs 200 and 201 in this particular embodiment. The inspector imparts to these two discs 200 and 201 increments of movements during the inspection of a lot of items to accumulate the data and the discs carry indicating means for indicating when the lot of items is rejectable or is acceptable. This indicator means comprises in this particular embodiment an electrical contact 202 on the disc 200 and the contacts 203 and 204 carried by the disc 201. The arrangement is such that when the relative position of the two discs causes the contact 202 to engage the contact 203 a signal lamp 203' is lighted to show the lot is acceptable and when the contact 204 engages the contact 202 the lamp 204' is lighted to indicate a rejectable lot. The disc 200 is shown in dot and dash lines to distinguish it from the disc 201 which is drawn in full lines in Fig. 26.

Any suitable mechanical movements may be employed for imparting to the discs 200 and 201 the movements thereof required to give the desired indications when the indicator 202 engages the indicators 203 and 204. In the particular embodiment shown the two discs are mounted for rotation about the same axis and are rotated in unison and in the same direction to impart to the discs differential angles of movement while for each rejectable item only one of the discs is operated, but in the particular embodiment this operation is always in the same direction as the direction of rotation of the other disc. The mechanical movement illustrated comprises ratchet wheels carried by the discs which are for convenience designated 200' for disc 200 and designated 201' for disc 201. These ratchet wheels are actuated by a pair of levers 211 and 212 with a pawl 209 carried by the lever 211 for operation of the ratchet wheel 200' and a pawl 210 carried by the lever 212 for actuating the ratchet wheel 201'. These levers are pivoted on the axis of the discs 200 and 201 and are actuated by the inspector by engaging the outer ends 211' and 212'. The lever 211 is actuated for each item inspected and provision is made for simultaneously actuating the lever 212 when the lever 211 is operated. This is effected through the cross bar 213 carried by the lever 211 and engaging a groove on the upper surface of the lever 212. The lever 212 however can be actuated independently to actuate the disc ratchet 201'.

The differential movements imparted to the discs 200 and 201 when the lever 211 is operated are effected by the ratchet wheels 200' and 201' being provided with teeth and with diameters to effect this purpose. In the particular embodiment shown the ratchet wheels 200' and 201' are shown of the same diameter and the ratchet wheel 200' is provided with a lesser number of ratchet teeth than the number of teeth on the ratchet 201'. For example, the ratchet 200' may be provided with 22 teeth while the ratchet 201' is provided with 24 teeth and this results in the ratchet wheel 200' achieving a greater angle of movement at each stroke of the lever 211 than the movement of the ratchet 201'. These two differential movements are indicated schematically in Fig. 25 which shows the ratchet teeth disposed in straight lines for convenience. The relative displacement of the ratchet teeth in Fig. 25 also represents one angular relation between the discs 200 and 201 which carry the indicator contacts. The stroke of the lever 211 must always be at least as large as the distance N between adjacent teeth of the ratchet wheel 201, in the particular embodiment shown, and in Fig. 25 the stroke is indicated as equal to the distance between these teeth although it is understood that the stroke may be slightly larger. With this arrangement although the pawls 209 and 210 move through the same distance at each stroke of the lever 211, it is observed that the ratchet 201' is actually actuated through a shorter distance due to the shorter distance between the ratchet teeth of the ratchet 201'.

Accordingly at each actuation of the lever 211 the disc 200 is moved through a predetermined angle to move the indicator contact 202 through that angle while the disc 201 is actuated through a slightly lesser angle to move the contacts 203 and 204 through that lesser angle but in the same direction. When the lever 212 is actuated the ratchet 201' with its disc 201 is actuated through the angle of the stroke of the lever 212 to carry the contacts 203 and 204 through an angular distance equal to the stroke of the lever 212. The lever 211 is biased by the spring 214 to the upper limit of its movement and a similar spring 215 maintains the lever 212 against the bar 213 in the normal position. This actuation is as indicated above, for each rejectable item. Each of the ratchet wheels 200' and 201' is prevented from backward rotation by suitable pawls, the ratchet 200' being arrested against backward movements by the pawl 209' and the ratchet 201' being held against backward movement by a similar pawl 210'. With the assumed 22 ratchet teeth for the ratchet 200' and 24 teeth for the ratchet 201' these pawls 209' and 210' may be either located at 180° from the pawls 209 and 210 or they may be located in the vicinity of the ratchets 209 and 210. In Fig. 24 these pawls 209', 210' are illustrated as disposed 180° from the pawls 209 and 210. In the schematic Fig. 25 pawls 209', 210' are illustrated as being located at 180° from the position shown in Fig. 24.

Thus by coordinating the movements of the discs 200 and 201 and the contacts 202, 203 and 204 the data for automatically indicating rejectable or acceptable lots may be obtained with a minimum number of items inspected. In the particular embodiment the discs 200 and 201 may be adjusted at the beginning of an inspection by simply adjusting the discs in the right direction to bring them into predetermined relation as, for example, with the indicator contact 202 disposed 120° from the contacts 203 and 204. The discs may be provided on their peripheries with markers or other means to indicate this adjustment at the beginning of an inspection operation is obtained. Such a marker is shown at 216 on the disc 200 and at 217 on the disc 201 both of which markers must be in line for proper adjustment.

The invention has been described with more particular reference to arriving at a decision as to whether any particular lot of items includes more than the permissible items which for one reason or another are rejectable. For example, such as manufactured items wherein it is desired to maintain a predetermined standard of uniformity in quality. That is, a lot of such items is said to be "rejectable" if the faulty or defective items are above a predetermined percentage, or a lot is "acceptable" when the percentage of faulty or defective items is within the tolerated percentage. However, the invention is usable in the reverse sense as, for example, for determining whether a lot of defective or faulty items contains more than the tolerated percentage of good or acceptable items, and in this case the so-called "rejectable" actuator would be operated for each good or acceptable item while the other actuator would be operated at least for each faulty or rejectable item. It is understood also that the invention is of more general application and usable in any case for arriving at a decision as to whether a lot of items should be classified one way or another or whether segregatable items, events or other data by reason of some difference should fall in one, two or more categories.

I claim:

1. A sequential sampling means comprising an accumulator disc, manually operable means for rotating the disc through a predetermined angle at least for each acceptable item, manually operable means for rotating the disc in an opposite direction through a different predetermined angle for each defective item, and means indicating when the disc reaches a predetermined limit of movement in either direction, said limits of movement in two opposite directions being related respectively to the acceptable and unacceptable quality values expressed in percentages and to the percentage risk in each instance.

2. In a means of the character set forth in claim 1 wherein said disc is frictionally mounted upon a driven disc and said driven disc is rotated by the means operable to rotate the accumulator disc through a predetermined angle at least for each acceptable item.

3. In a means of the character set forth in claim 1 wherein the accumulator disc moves an indicator control member which in one extreme position indicates an acceptable lot and in the other extreme position indicates a rejectable lot.

4. In a means of the character set forth in claim 1 wherein there are provided a multiple number of accumulator discs with means for operating said discs through a predetermined angle by a common means and a separate means for operating each disc in the opposite direction.

5. In a means of the character set forth in claim 1 wherein there are provided a multiple number of accumulator discs with means for operating said discs through a predetermined angle by a common means and a separate means for operating each disc in the opposite direction and a counter which is operated by the common actuating means.

6. A sequential sampling means comprising an accumulator disc, means operable to rotate the disc through a predetermined angle at least for each acceptable item, means for rotating the disc in an opposite direction through a different predetermined angle for each defective item, means indicating when the disc reaches a predetermined limit of movement in either direction, means for adjusting the range of movement of the disc, and means for adjusting the angular movements of the disc corresponding to each operation after the inspection of an item, said limits of movement in two opposite directions being related respectively to the acceptable and unacceptable quality values expressed in percentages and to the percentage risk in each instance.

7. A sequential sampling means comprising an accumulator disc, means operable to rotate the disc through a predetermined angle at least for each acceptable item, means for rotating the disc in an opposite direction through a different predetermined angle for each defective item, means indicating when the disc reaches a predetermined limit of movement in either direction, and means for adjusting the limits of movements of said disc, said limits of movement in two opposite directions being related respectively to the acceptable and unacceptable quality values expressed in percentages and to the percentage risk in each instance.

8. A sequential sampling means comprising an accumulator disc, manually operable means operable to rotate the disc through a predetermined angle at least for each acceptable item, manually operable means for rotating the disc in an opposite direction through a predetermined angle for each defective item, and means indicating when the disc reaches a predetermined limit of movement in either direction, the accumulator disc moving an indicator control member which in one extreme position indicates an acceptable lot and in the other extreme position indicates a rejectable lot and separate signal means for the extreme positions of said indicator member which are controlled by said indicator member.

9. A sequential sampling means comprising an accumulator disc, manually operable means operable to rotate the disc through a predetermined angle at least for each acceptable item, manually operable means for rotating the disc in an opposite direction through a predetermined angle for each defective item, and means indicating when the disc reaches a predetermined limit of movement in either direction, the accumulator disc moving an indicator control member which in one extreme position indicates an acceptable lot and in the other extreme position indicates a rejectable lot and separate signal means for extreme positions of said indicator member which are controlled by said indicator member and including control elements at the extreme positions of the control member which are adjustably mounted for varying the spacing thereof and the range of the indicator member.

10. A sequential sampling means comprising an accumulator disc, manually operable means operable to rotate the disc through a predetermined angle at least for each acceptable item, manually operable means for rotating the disc in an opposite direction through a predetermined angle for each defective item, and means indicating when the disc reaches a predetermined limit of movement in either direction, the accumulator disc moving an indicator control member which in one extreme position indicates an acceptable lot and in the other extreme position indicates a rejectable lot, said indicator member being coupled to the disc for positive actuation.

11. A sequential sampling means comprising two or more accumulator discs mounted for frictional drive on a common shaft, a manually operated lever for operating said shaft through a predetermined angle at least for each acceptable item, a separate lever for each disc for operating the same through a predetermined angle corresponding to a particular quality defect of the items being inspected, said separate levers operating the discs in opposite direction to that imparted by the first-named lever and certain of said discs carrying spaced stops for actuating different signals at the limits of movement of the discs.

12. In a sequential sampling device the combination of an indicator with means for actuating the indicator through a predetermined distance at least for each acceptable item, means for varying said distance, and means for actuating the indicator in the opposite direction through a different predetermined distance for each defective item, said predetermined distances being of unequal value.

13. In a sampling means, the combination of a control element with means for moving the control element through a predetermined distance at least for each acceptable item, means for varying said predetermined distance, means for moving the control element in the opposite direction through a predetermined and larger distance for each defective item, adjustable signal control elements between which said control element moves and separate signal means actuated by said signal control elements when the first-named control element reaches the signal control elements.

14. In a sequential sampling means, disc means for accumulating data from the final result of which one of at least two decisions is to be reached and means for imparting movement to at least a part of said disc means for items of one category and imparting movements to at least a part of said disc means for items of another category and means actuated by at least a part of said disc means for ultimately indicating one of at least two possible decisions, with the ratio of movements imparted to the indicating means by the movement imparting means determining the quality factors to be indicated by the indicating means.

15. A sequential sampling means comprising a driven disc, a ratchet wheel and gearing means for rotating said disc, a lever and pawl means for said ratchet wheel, a stop for determining the stroke of said lever and means for adjusting the same, an accumulator disc resting upon said first-named disc and frictionally driven thereby in one direction, a lever pawl device for directly engaging said accumulator disc to rotate the same upon the first-named disc, means for normally holding said last-named pawl out of engagement with the accumulator disc, a pair of separately adjustable discs carrying signal control elements and an indicator member driven by the accumulator disc to play between said control elements.

16. In a means of the character set forth in claim 9 wherein the control member is coupled to the accumulator disc for positive drive and the accumulator disc is provided with a serrated edge for engagement with the last-named pawl, a gap being formed in said serrated edge and the control elements comprising contacts with the control member being adapted to pass from one side to the other of one of the control elements.

17. In a means for sequential sampling, accumulating means for accumulating data from the final result of which one of at least two decisions is to be reached, a manually operable actuator for at least a part of said accumulating means for moving the same through a predetermined distance for one category, a manually operable actuator for moving at least a part of said accumulating means through another predetermined distance for another category, said movements being related respectively to the acceptable and unacceptable quality values expressed in percentages and to the percentage risk in each instance and means actuated by at least a part of said accumulating means for ultimately indicating one of at least two possible decisions.

WALTER P. KOECHEL.

REFERENCES CITED

The following references are of record in the file of this patent:

UNITED STATES PATENTS

| Number | Name | Date |
| --- | --- | --- |
| 923,511 | Greenbaum | June 1, 1909 |
| 1,195,754 | Weber | Aug. 22, 1916 |
| 2,008,909 | Hershey | July 23, 1935 |
| 2,057,911 | Obergfell | Oct. 20, 1936 |
| 2,168,443 | Johnson | Aug. 8, 1939 |
| 2,229,737 | Handley | Jan. 28, 1941 |
| 2,398,987 | Ziebolz | Apr. 23, 1946 |
| 2,477,395 | Sunstein | July 26, 1949 |